No. 778,895. PATENTED JAN. 3, 1905.
J. J. REXROTH.
MECHANICAL MOVEMENT.
APPLICATION FILED AUG. 24, 1901.

3 SHEETS—SHEET 1.

Witnesses:
J. B. Weir
Ira D. Perry

Inventor:
John J. Rexroth,
by Bond Adams Pickard & Jackson
his Attys.

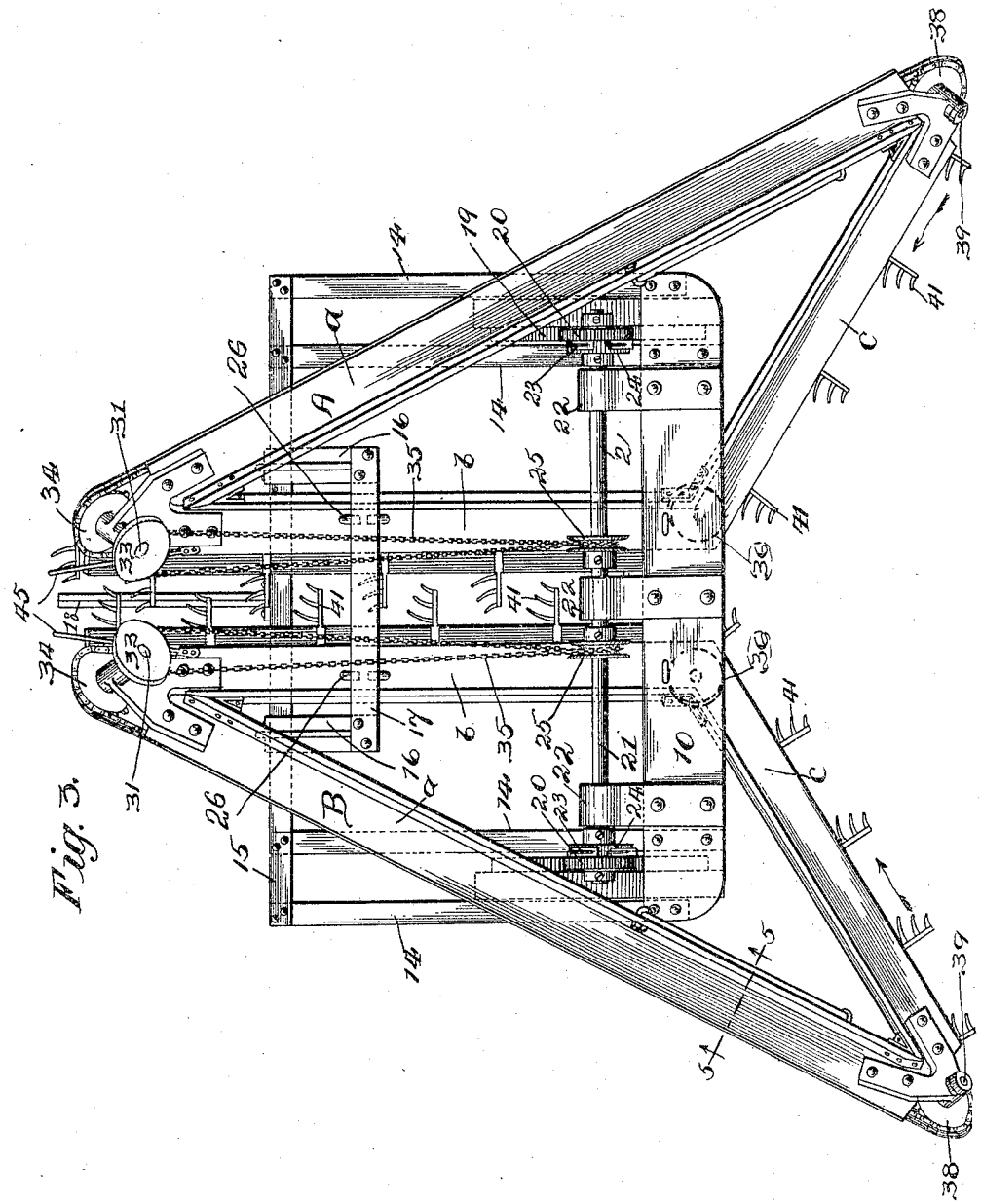

No. 778,895. PATENTED JAN. 3, 1905.
J. J. REXROTH.
MECHANICAL MOVEMENT.
APPLICATION FILED AUG. 24, 1901.
3 SHEETS—SHEET 3.
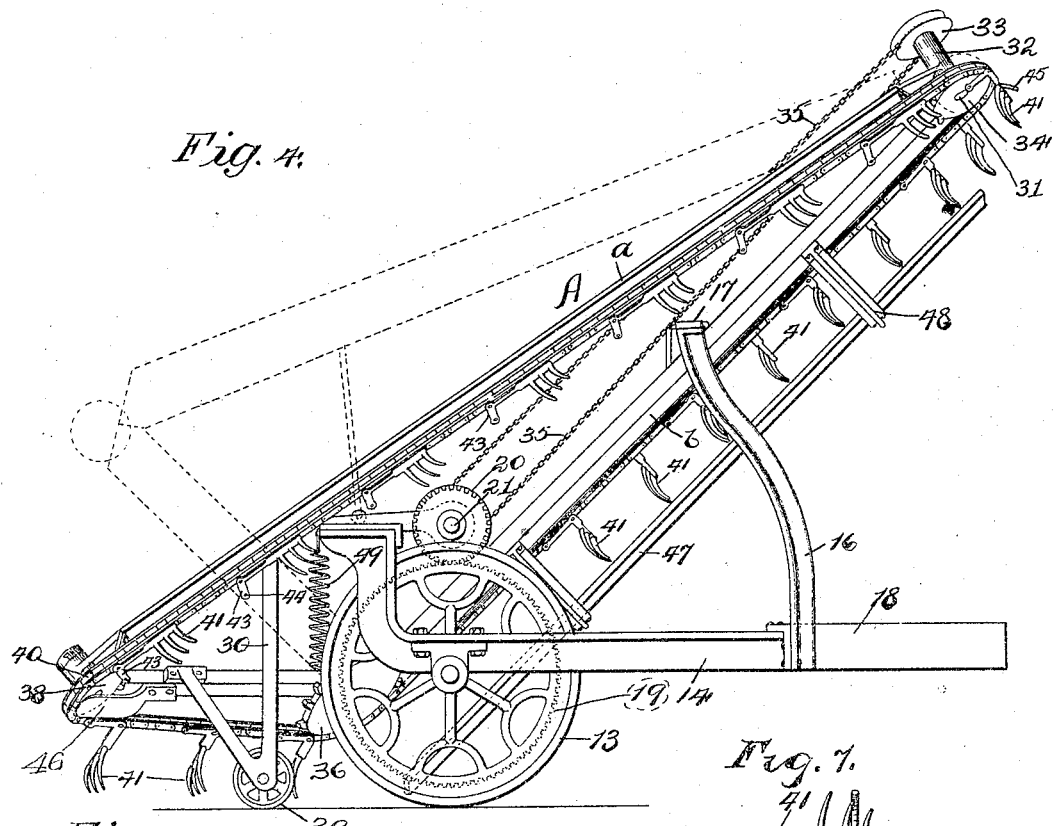
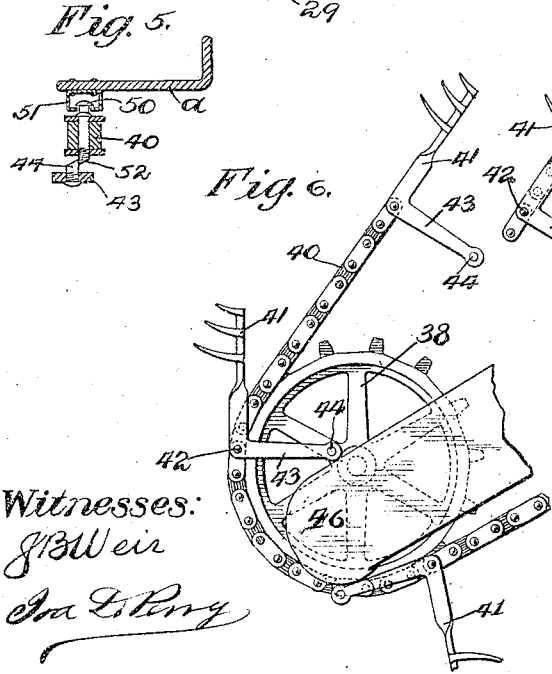
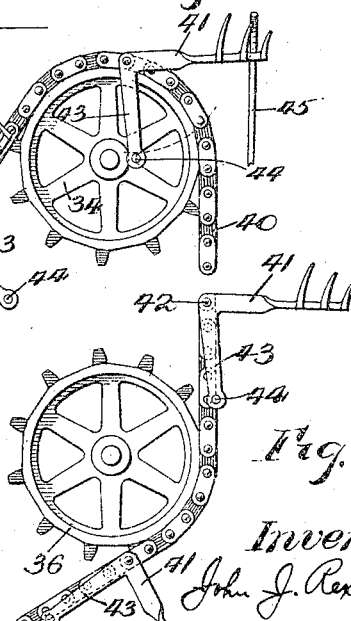
Witnesses:
J. B. Weir
Ira L. Perry
Inventor:
John J. Rexroth
by
Bond Adams Pickard Jackson
his attys.

No. 778,895. Patented January 3, 1905.

UNITED STATES PATENT OFFICE.

JOHN J. REXROTH, OF CHICAGO, ILLINOIS.

MECHANICAL MOVEMENT.

SPECIFICATION forming part of Letters Patent No. 778,895, dated January 3, 1905.

Application filed August 24, 1901. Serial No. 73,127.

*To all whom it may concern:*

Be it known that I, JOHN J. REXROTH, a citizen of the United States, residing at Chicago, in the county of Cook and State of Illinois, have invented certain new and useful Improvements in Mechanical Movements, of which the following is a specification, reference being had to the accompanying drawings.

My invention relates to a mechanical movement adapted for use in hay-loaders, conveyers, endless carriers, and the like; and it consists of the novel combination and arrangement of parts hereinafter more specifically described, illustrated in the accompanying drawings, and particularly pointed out in the claims hereunto appended.

In describing the invention in detail reference is had to the accompanying drawings, which illustrate a hay-loader with the parts forming the mechanical movement attached thereto, and in which—

Figure 1:
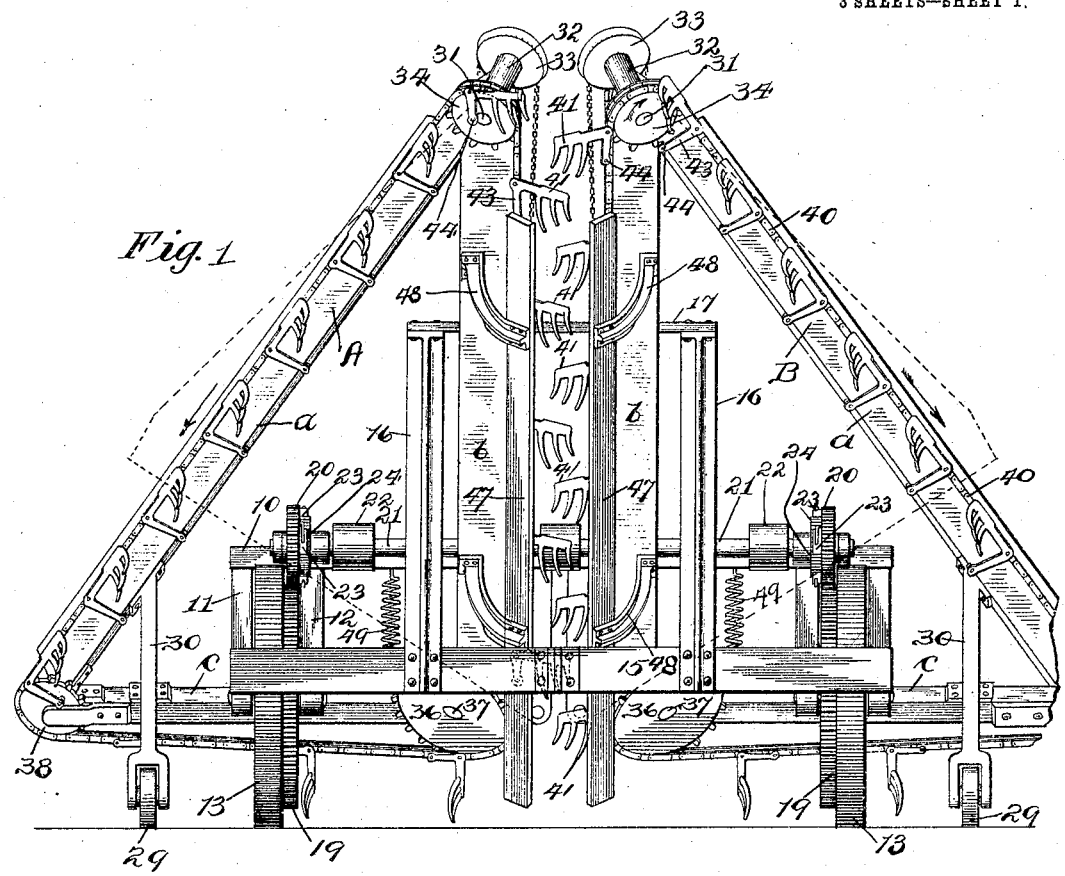
Figure 2:
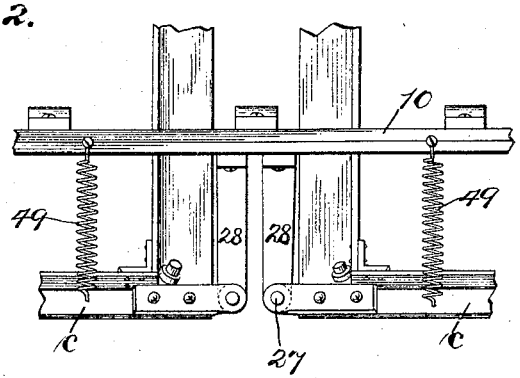

Figure 1 is a front elevation of a hay-loader with the parts forming the mechanical movement attached thereto. Fig. 2 is a detail taken from the rear, illustrating the mounting of the lower portions of the rake-frames. Fig. 3 is a plan view. Fig. 4 is a side elevation. Fig. 5 is a section on line 5 5 of Fig. 3; and Figs. 6, 7, and 8 are details illustrating the sprocket-wheels, rake-chains, and the rakes carried thereby forming the mechanical movement.

Referring to the drawings, the carriage of the hay-loader is composed of a transverse beam 10, having depending arms 11 12 at its ends forming forks, in which are mounted the supporting-wheels 13. Bars 14, preferably four in number, project forward from each end of the beam 10 and are connected by a transverse bar 15, forming a rectangular frame, as shown in Fig. 3.

16 indicates two bars that rise from the bar 15, extending slightly backward therefrom, and are connected at their upper ends by a cross-bar 17, as shown in Figs. 1 and 3. This latter frame, composed of the bars 16 and 17, is designed to assist in supporting the rake-frames, as will be hereinafter described.

18 indicates a draft-bar extending forward from the bar 15, as shown in Figs. 3 and 4.

19 indicates gears connected to and rotating with the carrying-wheels 13, as shown in Figs. 1 and 4. 20 indicates pinions which mesh with said gears 19, said pinions being carried by a transverse shaft 21, mounted in bearings 22, carried by the beam 10, as best shown in Fig. 3. By this construction as the machine progresses the pinions 20 and shaft 21 are rotated. The pinions 20 are loosely mounted on the shaft 21 and are provided with pawls 23, adapted to engage ratchet-wheels 24, mounted upon and keyed to the shaft 21, as shown in Fig. 1. The arrangement is such that when the carrying-wheels rotate as the machine moves forward the pawls 23 will engage the teeth of the ratchet-wheels 24, causing the shaft 21 to rotate. When, however, the carrying-wheels are reversed, the shaft 21 is not rotated.

25 indicates pocket-wheels mounted on the shaft 21 at opposite sides of the central bearing 22, as shown in Fig. 3.

A B indicate the two triangular frames of the hay-loader. The corresponding parts carried by each frame are identical in construction, so that the same reference characters will be employed to indicate them. As shown in Figs. 1 and 3, the frames A B are triangular in form, each having three side beams *a b c*, the side beams *b* being arranged parallel with each other and a short distance apart, as shown in Fig. 3. 26 indicates pivots which pivotally support the beams *b* of the two frames A B, said pivots consisting of hooks which are secured to the upper portions of the beams *b* and have their ends fitted in bearings in the cross-bar 17, as shown in Fig. 3. The lower end of each beam *b* is supported by a pivot 27, carried by an arm 28, depending from the cross-beam 10, as shown in Fig. 2. The pivots 26 27 of each frame are substantially in line, so that the lower outer ends of said frames may be swung upward or downward, as desired. When the frames A B are in their lowermost position, their outer ends lie near the ground and the sides *c* of each frame extend substantially parallel with the ground and are inclined inward from the lower outer portion of each frame toward the center of the machine, the two beams *c* lying at an angle to each other of one hundred degrees, more or less. When the frames are folded up out of operative position, they have the appearance of a butterfly's wings when folded and then extend vertically centrally of the carriage. By securing the frames together when raised this position will be maintained, and they may then be readily transported. When in operative position, the outer portions of the frames A B are supported by caster-wheels 29, mounted in arms 30, which are carried by the frames A B, as shown in Fig. 1.

31 indicates shafts mounted in suitable bearings 32 at the upper corners of the frames A B, respectively. Each of said shafts carries at its ends a pocket-wheel 33 and a sprocket-wheel 34, respectively. The pocket-wheels 33 are arranged at the rear ends of the shafts 31, as shown in Fig. 3, and are connected with the pocket-wheels 25 by chains 35, as also shown in Fig. 3. By this construction when the shaft 21 rotates the shafts 31, with the sprocket-wheels 34, are also caused to rotate.

36 indicates sprocket-wheels mounted on studs 37 at the lower inner corners of the frames A B, as best shown in Fig. 1, said sprocket-wheels being substantially practically at opposite ends of the beams $b$ of the two frames, as best shown in Fig. 1. 38 indicates sprocket-wheels mounted on studs 39 at the lower outer corners of the frames A B, said sprocket-wheels being substantially at opposite ends of the beams $c$.

The foregoing description relates to a hay-loader in which my improved mechanical movement is adapted to be used, the movement not only being adapted for use in connection with hay-loaders, but for conveyers, endless carriers, and the like, and the parts forming the mechanical movement will now be described and specifically pointed out as used in connection with a hay-loader. In the following description a bell-crank lever forms a part of the mechanical movement, and as the movement is shown in connection with a hay-loader the bell-crank levers are termed "rakes." Instead of being employed for rakes these levers can be employed with buckets or other carrying means.

40 indicates endless chains or carriers, which are constructed of inner and outer links, the outer links being arranged in pairs and the inner links having their ends suitably secured to and between each pair of outer links, the chains or carriers mounted to run around the sprocket-wheels 34, 36, and 38 of the frames A B, respectively, thereby forming endless carriers, which by the rotation of the sprocket-wheels 34 are caused to move continuously around the rake-frames A B. The sprocket-wheels 34 are caused to rotate in the direction indicated by the arrow in Fig. 1, thereby moving the carriers 40 in the direction indicated by the arrows in said figure.

41 indicates rakes, a series of which are carried by each carrier 40, as best shown in Figs. 1, 4, and 6. Each of said rakes is mounted on a pivot 42, secured to the carrier 40 so that it may swing in the arc of a circle when not restrained from so doing. When in operative position, the rakes 41 extend outward at right angles to the carrier 40, as shown in Fig. 8; but they are adapted to be turned to the position shown at the left in Fig. 7 when not in operative position. Each of the rakes 41 is provided with a crank-arm 43, which extends substantially at right angles thereto, as shown in Figs. 6 and 8, giving the entire rake somewhat the appearance of a bell-crank lever. Said arms 43 carry in their outer ends pins or retaining devices 44, which are so placed that when the arms 43 extend parallel with the carrier, as shown in Fig. 8, said pins 44 engage the outer links of the carrier, as shown. When, however, the carrier passes around one of the sprocket-wheels 34 or 38, the carrier assumes the form of an arc of a circle, the arm 43 of the rake forming the chord of such arc. By this means the pin 44 is caused to project beyond the outer link of the carrier to the space between two of such outer links, and consequently said pin can pass between two of the outer links, permitting the rake to swing inward out of operative position or out into operative position, as the case may be. It is of course necessary that the rakes be held in operative position when moving under the horizontal beams $c$ and up between the vertical beams $b$, and it is desirable that they be moved out of operative position when moving down over the inclined beams $a$. To secure this result, rods 45 are provided at the upper ends of the frames A B, which are adapted to engage the rakes 41 as they pass around the sprocket-wheels 34 and cause them to fold back as the carrier progresses, as shown in Fig. 7. The rakes are returned to operative position upon reaching the sprocket-wheels 38 by means of cam-plates 46, which extend parallel with the sprocket-wheels 38 in position to engage the pins 44 of the arms 43 when the rakes reach said sprocket-wheels 38, as best shown in Fig. 6, said cams acting to rock the arms 43 about the pivots 42, carrying the pins 44 outward beyond the carrier 40, said pins 44 passing out between the ends of two of the outer links of the carrier, as already described. As soon as the pin 44 of any arm 43 passes beyond the sprocket-wheels 38 it is held out by engagement with one of the outer links, holding the rake in operative position. The sprocket-wheels 36 do not operate to release the rakes 41 and permit them to move out of operative position, since said sprocket-wheels are made so large in diameter that the carrier is not curved sufficiently to cause the arms 43 to extend far enough to permit the pins 44 to pass between the outer links of the carrier.

It will be understood that while I employ a carrier made of single and double links arranged successively in the usual way and hold the rakes 41 in operative position by engagement of the pins 44 with the outer links, as above described, I do not confine myself to this specific construction, since in lieu of having the pins 44 engage such outer links the carrier may be provided with equivalent devices, such as projections 52, (shown in Fig. 5,) adapted to be engaged by said pins and to be released from such engagement by the curving of the carrier, as described.

47 indicates boards which are secured by brackets 48 centrally of the machine, extending from near the ground to near the top of the frames A B in position to support the hay as it is carried up by the rakes. As shown in Fig. 1, the boards 47 appear to be a considerable distance apart; but they are shown separated in the drawings in order not to hide the rakes. In practice they are almost in contact with each other.

49 indicates springs, the upper ends of which are connected to the beam 10, their lower ends being connected to the beams c of the frames A B in such manner as to yieldingly support the outer portions of the rake-frames A B. Said springs not only cause the rake-frames to run yieldingly on the ground, but they assist in raising said frames when it is desired to turn them up out of operative position.

The carrier is prevented from sagging by pins 50, which project therefrom at short intervals, said pins having heads which travel in slotted guides 51, secured to the under sides of the beams $a\ b\ c$, as shown in Fig. 5.

The operation of the machine has already been described; but I wish to say, further, that the machine is hitched on behind a wagon, and when the field to be raked is reached the frames A B are turned down to the position shown in Fig. 1. The carriers being operated by the forward movement of the machine, the rakes 41 move from the outer lower corners inward and toward the center, as shown by the arrows in Fig. 3, raking the hay toward the center and carrying it up upon the boards 47 to the top of the machine, where it is discharged into the wagon. As the rakes move inward and upward they are held in operative position by the pins 44, carried by the arms 43, which then lie outside of the links of the carrier and engage the outer links. As soon as a given rake reaches the upper corner of the frame its pin 44 is released by the bending of the chain around the sprocket-wheel 34 and the rake is carried back by the arm 45 so that it lies parallel with the carrier in the position shown at the left in Fig. 7. The rake remains in this position until it again reaches the sprocket-wheel 38, where it is turned out to operative position by the cam 46.

I do not restrict myself to the use of my improvement in hay-loaders, as it may be employed for any purpose to which they are adapted. Particularly with reference to the devices for operating the raking devices to move them into or out of operative position my invention is not restricted to the devices illustrated for use only in connection with rakes, as such devices may also be employed for controlling the position of other devices carried by a flexible carrier.

That which I claim as my invention, and desire to secure by Letters Patent, is—

1. The combination of an endless carrier, a wheel around which said carrier travels, and a bell-crank pivotally mounted on said carrier, one of the arms of said bell-crank having a pin adapted to engage a portion of said carrier when said carrier is straight to hold said bell-crank in a certain position, said pin being adapted to be released and move by said portion of the carrier when said carrier is curved in passing around said wheel, substantially as and for the purpose specified.

2. The combination of a carrier consisting of a link belt composed of inner and outer links, a wheel around which said carrier travels, and a bell-crank pivotally mounted upon said chain, one of the arms of said bell-crank having a pin adapted to engage one of the outer links of said carrier when said carrier is substantially straight and to project beyond the outer link when said carrier is curved in passing around said wheel, substantially as described.

3. The combination of a carrier consisting of a link belt composed of inner and outer links, a wheel around which said carrier travels, a bell-crank pivotally mounted upon said chain, one of the arms of said bell-crank having a pin adapted to engage one of the outer links of said carrier when said carrier is substantially straight and to project beyond the outer link when said carrier is curved in passing around said wheel, and a rake carried by the other arm of said bell-crank, substantially as described.

4. The combination of an endless carrier, operating means therefor, and a bell-crank pivotally connected with the carrier, said bell-crank having a member adapted to move across said carrier and into and out of engagement therewith during the travel thereof for controlling the position of the bell-crank, substantially as described.

5. The combination of a traveling carrier, a bell-crank pivotally connected therewith and having means adapted to bear against a portion of the carrier when the latter is in one position, and means for deflecting the carrier to move the bearing portion thereof out of engagement with said bell-crank and permit the bearing portion of the bell-crank to move past the carrier, substantially as described.

6. The combination of an endless carrier, operating means therefor, a bell-crank pivotally connected thereto, and means provided on one arm of the bell-crank and adapted to engage the carrier for retaining the bell-crank in an operative position, said retaining means being movable transversely of the carrier.

7. The combination of an endless carrier, a bell-crank pivotally connected therewith and having a portion adapted to move transversely of the carrier, and means controlled by the position of the carrier for preventing such transverse movement of the bell-crank, substantially as described.

8. A mechanical device consisting of a flexible carrier, a member carried thereby, and having means movable by a portion of the carrier and adapted to engage the carrier when the latter is in one position and to be released from such engagement so that it may move across the carrier when the carrier is deflected to another position, substantially as described.

9. A mechanical device, consisting of a flexible carrier, a member carried thereby and having a retaining device adapted to move across the carrier, and means operated by the bending of the carrier for engaging or releasing said retaining device for controlling the position of said member, substantially as described.

10. The combination of an endless carrier, operating means therefor, a bell-crank pivotally connected thereto, and means provided on one arm of the bell-crank and adapted to engage the carrier when the carrier is in one position and to be disengaged therefrom and move across the carrier when the carrier is bent to another position, substantially as described.

11. A mechanical device, consisting of a flexible member, a member pivotally connected therewith, means carried by said flexible member adapted when said flexible member is in one position to engage said pivoted member to control the position thereof, and when said flexible member is in another position to move out of position to engage the same, and means for deflecting said flexible member to control the position of said pivoted member by moving said controlling means into or out of operative engagement therewith, substantially as described.

12. The combination of an endless carrier, and a member pivotally connected with the carrier and having means adapted to move across said carrier and movable into and out of engagement therewith during the travel thereof for controlling the position of said member.

JOHN J. REXROTH.

Witnesses:
A. H. ADAMS,
JULIA M. BRISTOL.